W. A. JOY.
Parallel Rulers.

No. 147,943. Patented Feb. 24, 1874.

WITNESSES

INVENTOR,
W. A. Joy

By his Attorneys.

UNITED STATES PATENT OFFICE.

WILLIAM A. JOY, OF BROOKLYN, NEW YORK.

IMPROVEMENT IN PARALLEL-RULERS.

Specification forming part of Letters Patent No. 147,943, dated February 24, 1874; application filed August 20, 1873.

*To all whom it may concern:*

Be it known that I, WILLIAM A. JOY, of Brooklyn, in the county of Kings and State of New York, have invented a new and Improved Parallel-Ruler; and I do hereby declare the following to be a full, clear, and exact description of the same, reference being had to the accompanying drawings forming part of this specification, in which—

Figure 1:
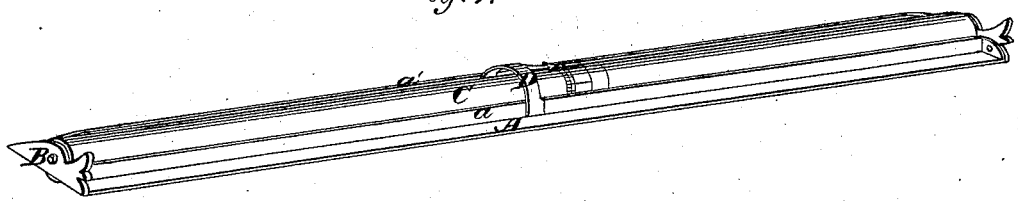
Figure 2:
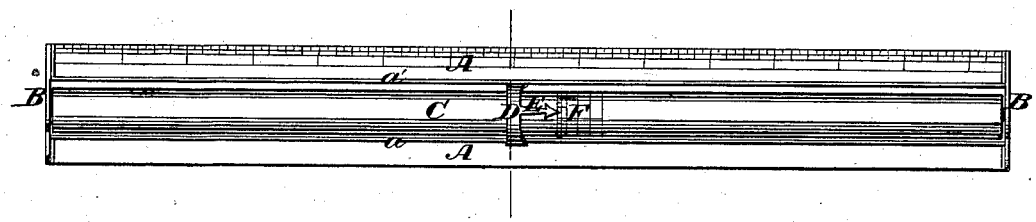

Figure 1 is a perspective view of my invention. Fig. 2 is a plan view of the same; and Fig. 3, a transverse section through line *x x*, Fig. 2.

Similar letters of reference in the accompanying drawings indicate the same parts.

My invention has for its object to provide for the public, and more especially for book-keepers and accountants, a ruler adapted for ruling parallel lines at uniform distances apart, which shall be simple in construction, neat and ornamental in appearance, convenient to handle, and in which the ruling-edge shall not be liable to spring or bend, so as to come in contact with the surface of the paper. To these ends my invention consists in a ruling-frame, of peculiar construction, combined with a rotary cylinder journaled therein, the frame being provided with a stationary pointer or index, and the roller with a graduated section, all of which I will now proceed to describe.

A A' represent thin parallel bars, of metal or other suitable material, each bar being bent at right angles longitudinally into flanges *a a'*, the flange *a'* being the wider. The bars A A' are riveted at their ends to transverse plates B B, the lower edges of which are straight, while their upper edges are curved ornamentally, as shown, the lower sides of the bars A A' being flush with the lower edges of the plates B. Between the bars A A' is a space, of sufficient width to receive a cylinder or roller, C, whose ends are journaled in the plates B B.

Figure 3:
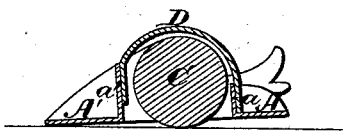

The cylinder C is of such diameter that its periphery extends below the lower edges of the end plates B, and bars A A', and the bar A' being the heavier, the frame, composed of the bars and plates, is tilted, as shown in Fig. 3, so that the bar A is held above the surface of the paper on which the instrument rests, and does not come in contact therewith.

D represents a curved bridge riveted to the flanges *a a'*, and extending across the cylinder C, at its center said bridge carrying a fixed pointer, E, which projects over a graduated section, F, of the cylinder, and indicates the distance traveled by the ruler as the cylinder revolves, thus enabling the lines to be drawn at uniform distances apart.

The operator holds the ruler by placing his thumb against the side flange *a'*, and his forefinger against the bridge D at the opposite side of the cylinder, the instrument being thus easily guided and handled. The bar A is elevated above the surface of the paper by the weight of the bar A', consequently the paper is not liable to be smeared by the ink which may adhere to the edge of the bar.

The angular form of the bars A A' enables them to be made of thin metal or like convenient material, and at the same time time gives sufficient stiffness to prevent them from being bent or sprung under ordinary usage.

The construction is, therefore, strong, light, cheap and simple, and the general appearance ornamental.

I am aware that a graduated revolving cylinder and a fixed index-finger have been used in a ruler, and I do not, therefore, desire to claim their use broadly; but

Having thus described my invention, what I claim is—

The angular bars A A', the bar A' being heavier than the bar A, in combination with the bridge D carrying the pointer E and roller F, provided with a graduated scale, the whole being constructed and operated in the manner and for the purpose set forth.

WM. A. JOY.

Witnesses:
 THOS. J. ROBERTS,
 S. M. DEWEY.